Figure 1:
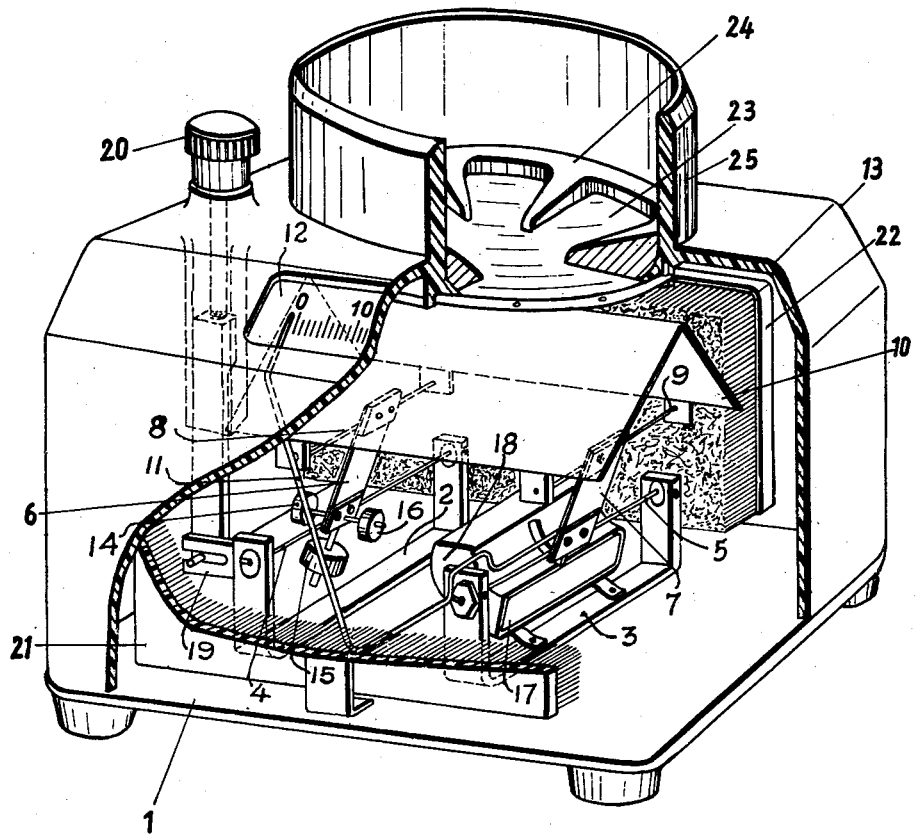

Nov. 28, 1950  G. FIEDLER  2,531,844
INSTRUMENT FOR MEASURING COMPRESSIONAL
WAVE RADIATION PRESSURE

Filed May 13, 1949  2 Sheets-Sheet 1

Inventor.
Georg Fiedler.
By [signature] Atty.

Patented Nov. 28, 1950

2,531,844

UNITED STATES PATENT OFFICE 2,531,844

INSTRUMENT FOR MEASURING COMPRESSIONAL WAVE RADIATION PRESSURE

Georg Fiedler, Erlangen, Germany

Application May 13, 1949, Serial No. 93,148
In Germany December 30, 1948

24 Claims. (Cl. 181—0.5)

This invention relates to a device for measuring the radiation-pressure exerted by waves, and particularly for measuring ultrasonic radiation pressure. The invention provides an easily manageable, portable, completely enclosed measuring instrument of this character, having a scale which may be suitably calibrated, for instance, in increments of acoustical power (watts), and facilitates the manufacture thereof.

The invention provides within a container filled completely with a sound-conducting liquid, e. g., water, and having a sound-permeable wall portion, a sound reflecting and/or absorbing displacement body of solid material disposed within the sound field, said body being movable in the direction of the sound radiation against a reacting force, and an indicating element which is moved by the displacement of the body responsive to sound radiation pressure impinging thereon. The reflecting body in prior structures usually is a disk suspended on a torsional ribbon within the sound field, perpendicular to sound propagation, which due to radiation pressure will turn about 90 degrees. This rotation is transmitted either mechanically to a pointer forming an indicating element or is made visible by deflection of a light beam. It is of disadvantage in such prior structures that the resulting force will not be proportional to radiation pressure in the presence of an increase thereof, because the effective area of the disk hit by the sound waves will decrease with its rotation, changing the angle of incidence of the radiation; and since the rotation of the disk depends not only on the radiation pressure but also on the point of incidence with respect to the rotational axis, non-homogeneous sound sources, as they are encountered in most cases within the ultrasonic range, cannot be properly compared and measured. A further disadvantage of prior radiometers is that they are limited to measuring sound radiation pressures which are directed horizontally.

An object of the invention is to provide an instrument comprising a completely enclosed container completely filled with a sound-conducting liquid, e. g., water, a portion of the container wall being permeable to sound, an absorbing and/or reflecting displacement body of solid material being disposed within the sound field in said container, said body being movable in the direction of the sound radiation by attachment to one side of a rhomboid system, the other side of which is fastened to a wall of the container, while the sides of the system are flexibly linked in such a way that their angles are variable against a reacting force in the presence of sound radiation pressure on said body. The reflecting and/or absorbing body will thus always give way in a direction parallel to itself. The force exerted on the body will increase proportional with radiation pressure, and the amount of shifting motion will be independent of the point of application of the radiation pressure.

Another object of the invention is to provide a rhomboid carrying system for the absorbing and/or the reflecting displacement body, the flexible joints of the sides of which are made of torsional strings or ribbons. Bearing friction is thus completely avoided. The torsional ribbons are suitably adjusted in such a way that the angles of the system deviate at zero position only little from 90 degrees. In this initial position of the system, the instrument has its largest working angle.

A further object of this invention is to provide a carrying system for the absorbing and/or reflecting displacement body, comprising four torsional ribbons disposed in parallel to each other, two of the ribbons being fastened to the body at their ends, the other two being fastened at their ends to the wall of the casing, and each one of the ribbons attached to said body being connected to the corresponding one of the ribbons attached to the wall, by a rigid preferably bar-shaped member, which is suitably attached to the center of the ribbons between their fixed ends. One of these bar-shaped members carries a pointer.

According to the invention, the torsional ribbons may also be secured by forked ends of the bar-shaped parts and attached to the displacement body and to the container wall, respectively, at their center, between the fixed ends. Compared with this arrangement, the first noted structure has the advantage of low weight of the carrying system due to smaller link members and due to the possibility of using, if required, variable adjusting means at the fixed part of the system.

The weight of the system may cause a distortion of the torsional ribbons depending on the instrument's position. This distortion may be compensated, in accordance with another object of the invention, by a counterweight comprising at least two separate weight members which are adjustable in two directions at right angles to each other.

For counterbalance, the rhomboid system may also coact with another such system in such a way that the side situated at the container wall is common to both systems and that their adjoining sides include an angle of about 90 degrees. This second system prevents the instrument from becoming unstable for angles of the first system which are approaching 0 and 180 degrees, respectively, since in such position the angles of the second system will be about 90 degrees, which is the condition of greatest stability. The working angle of the compound system can thus be made larger than 90 degrees.

Instead of compensating the weight of the system by counterweights which exert an additional bending strain on the ribbons, it is of advantage to provide means which exert a corresponding buoyancy on the system. For this purpose the displacement body and desired and suitable rigid parts of the system may be made of a material whose specific weight is equal to or less than that of the sound-conducting liquid. If desired, an auxiliary member of such character may be associated with the system to provide the desired buoyancy.

The instrument may be equipped with damping flaps which may be placed within a dashpot or damping cylinder, if strong damping is desired. Such flaps are preferably secured to the rigid link members which are associated with the torsional ribbons.

A device may be secured to one of the torsional ribbons which is fastened to the container wall, which serves for zero point adjustment by adjustably twisting the ribbon.

A further object of the invention is to provide an absorbing and/or reflecting displacement body which is disposed at an angle to the front of the sound waves in order to prevent the formation of standing waves of incoming radiation and also the one, reflected by the body. The body may for this purpose be formed in sloping saddle-roof shape and adjusted in such a way that its ridge extends in the plane of motion of the system. The effective component of radiation pressure causing the yielding motion will then be exclusively in the direction of sound radiation. The system therefore will not be exposed to stresses at right angles to the direction of sound radiation.

In accordance with still another object, the invention provides a sloping reflecting body and an absorbing body disposed in the path of the reflected radiation. The absorbing body may be made of fibers, e. g., of a suitable plastic such as polyvinylchloride or polyamide fibers, which are disposed to extend substantially in the direction of the reflected radiation.

Complete filling of the container or casing with sound-conducting liquid requires means for taking care of expansion, e. g., an expansion chamber. The sound-permeable portion of the casing wall is for this purpose formed by a membrane which takes over the functions of an expansion chamber. In accordance with further features of the invention, the whole container or casing may be made of material of a coefficient of expansion which practically equals the one of the conducting liquid. If water is used, the casing may suitably be made of polyvinylchloride to meet this requirement.

In accordance with still another object of the invention, the casing at its sound input side may carry an open ended tubular coupling extension for accommodating the sound-transmitting unit and containing a liquid for reliably conducting sound therefrom to the sound-permeable wall portion. The inner walls of this coupling extension are suitably shaped to conform substantially to the outer shape of the sound-transmitting unit, so as to serve as a guide and support therefor.

The foregoing objects and additional objects and features of the invention will become apparent from the description of some embodiments, which will be rendered with reference to the accompanying drawings. In these drawings, Fig. 1 shows in diagrammatic representation an embodiment of the invention, with part of the casing wall broken away; and Fig. 2 illustrates essential parts of a modification, with the casing omitted.

Figure 2:
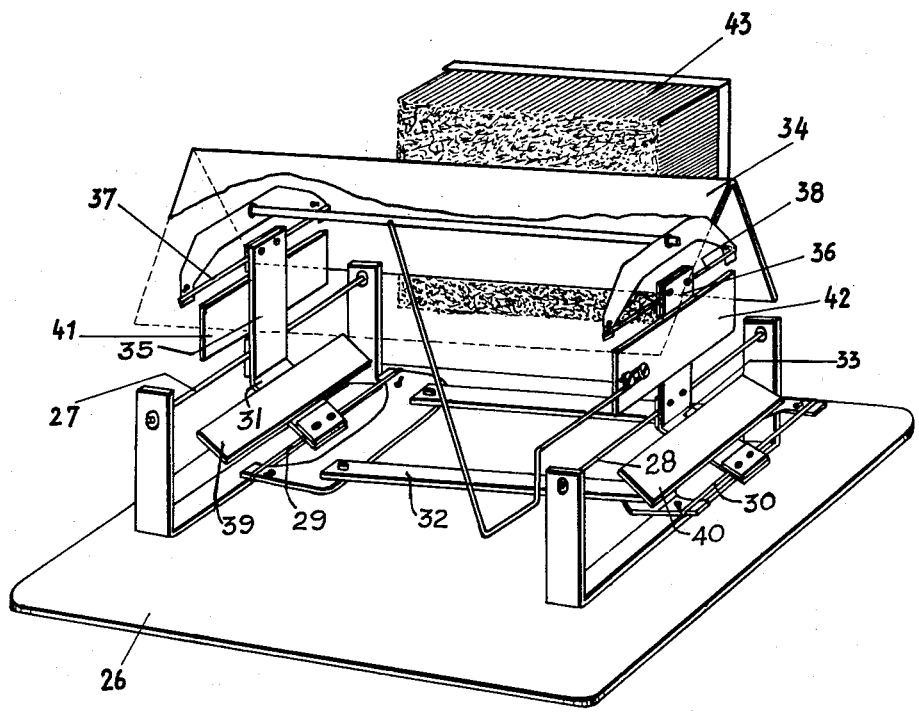

Referring now to Fig. 1, numeral 1 indicates a brass base 1 supporting two U-shaped brass brackets 2 and 3 which carry the two parallel torsional ribbons 4 and 5 made of suitable material, e. g., of tin bronze. Secured to each of these ribbons, substantially centrally thereof, is a rigid bar-shaped link member 6 and 7, respectively, made of a suitable plastic material. To the other ends of these link members are secured the torsional ribbons 8 and 9, respectively, which carry the sloping saddle-roof-shaped displacement body 10 made of a suitable plastic material.

The displacement body 10, the link members 6 and 7, and the base plate 1 form a parallelepipedic, framelike system whose angles at zero position deviate only slightly from 90 degrees and whose sides are flexibly linked by the torsional ribbons 4, 5, 8 and 9 in such a way that the radiation pressure on the displacement body 10, due to the impressed radiated sound waves, will change the angles of the system against the reacting force of the torsional ribbons. This change of angles is indicated by the pointer 11, carried by the link member 7, on the scale 12 which is inserted into the wall of the hoodlike casing 13 in such a way that it can be read from the outside. The scale may be calibrated, e. g., in watts.

The distortion of the ribbons, from their zero position, by the weight of the displacement body 10 and the link members 6 and 7 is compensated by three weights 14, 15 and 16 which are adjustable in two directions at right angles to each other.

The link member 7 is connected with the damping flap 17, which moves within the arcuate dashpot or damping cylinder 18.

The mounting member associated with a leg of the bracket 2 and holding one end of the ribbon 4 coacts with the lever arm 19. The free end of this lever arm has a slot into which fits a peg extending from a rod or barlike member which may be lowered or raised by means of the adjusting knob 20. The ribbon 4 may thus be slightly twisted to adjust the instrument to zero.

Absorbers 21 and 22 are arranged one on each side of the reflecting body 10. They may be made of polyvinylchloride or polyamide fibers which are fastened in a frame in such a way that they extend substantially in the paths of the radiation to be absorbed. These absorbers convert into heat the sound radiation reflected from the reflecting body 10.

The hoodlike part 13 of the casing which is suitably assembled in liquid-tight connection with the brass base 1 may also be made of polyvinylchloride. At its top there is a circular opening, which is closed by the sound-permeable diaphragm 23. This diaphragm may be very thin or it may be made of a suitable material of a characteristic sound impedance substantially equal to that of the conducting liquid. The diaphragm may also be made of a thickness of an even multiple of half-waves. In the illustrated case it is 40μ thick and made of polyamide.

Above the diaphragm is disposed a star-shaped grate 24 which serves as protection therefor and also as a support for the sound transmitter.

The casing 13 carries the tubular extension 25, at the plane of sound input, which forms an open coupling container for accommodating the sound-transmitting unit and a coupling liquid which conducts the radiated sound to the diaphragm 23. The shape of the inner wall of tubular extension conforms substantially to the outer shape of the transmitting unit, thus guiding, supporting and fixing it in position.

The hole for injecting liquid into the casing is disposed under the adjustment knob 20 which forms a liquid-tight closure therefor. The instrument may be completely filled with degassed distilled water.

Since polyvinylchloride, of which the casing is made, has substantially the same coefficient of expansion as water, a separate expansion chamber is not necessary.

The system of the instrument shown in Fig. 2 is mounted on the base 26. Instead of using counterweights and damping means, the structure is provided with a second parallelepipedic, frame-shaped system, connected with the first one for coaction therewith. The second system is formed by the torsional ribbons 27, 28, 29 and 30, the band-shaped link members 31, 32, 33 made of suitable plastic material, and the base plate 26. The first system comprises the displacement body 34, the link members 35 and 36, the torsional ribbons 27, 28, 37 and 38, and the base plate 26. The ribbons 27, 28 and the base plate are therefore common to both systems. The adjoining links 31 and 35 and 33 and 36, respectively, enclose angles of about 90 degrees. In the unstable positions of the first system (if its angles are almost zero or 180 degrees) the second system, whose angles then will be about 90 degrees, will therefore have a stabilizing effect. Both systems are dimensioned by the size of their rigid link members in such a way that they are similar as to their weights as well as to their buoyancy. The ribbons therefore will not suffer any strain.

The displacement body may be made of a suitable foamy plastic material or of doubled metal sheet sealed together liquid-tight to form an interior air space.

Sufficient damping of the system is obtained by the damping flaps 39, 40, 41 and 42 carried by the link members 31, 33, 35 and 36, respectively. Only one of the absorbers which converting into heat the radiation reflected from the displacement body 34 is shown in the drawing at 43.

I claim:

1. Instrument for measuring sound radiation pressure comprising a container completely filled with a suitable sound-conducting liquid, part of a wall of said container being permeable to sound, a rhomboid system secured at one side to an inner wall of said container and carrying at its other side a body of solid material which is disposed within the sound field in said container, said body being movable against a reacting force in the direction of the sound radiation by means which flexibly link the sides of said system in such a manner that the system can change the size of its angles responsive to sound radiation pressure impinging on said body, an indicating element, and means for transmitting the displacement of said body to said indicating element.

2. The measuring instrument according to claim 1, together with torsional ribbons for flexibly linking the sides of said system.

3. The measuring instrument according to claim 1, together with torsional ribbons for flexibly linking the sides of said system, and means for adjusting said torsional ribbons to place said system in zero position in which the angles thereof deviate only slightly from 90 degrees.

4. The measuring instrument according to claim 1, together with torsional ribbons for flexibly linking the sides of said system, and means for compensating the distortion of said ribbons caused by the weight of the system in any position of said instrument.

5. The measuring instrument according to claim 1, together with torsional ribbons for flexibly linking the sides of said system, and a counterweight for compensating the distortion of said ribbons caused by the weight of the system in any position of said instrument, said counterweight comprising at least two weight members which are adjustable in two directions at right angles to each other.

6. The measuring instrument according to claim 1, together with torsional ribbons for flexibly linking the sides of said system, together with a second rhomboid system whose sides are flexibly linked by torsional ribbons, said second system being secured to the first system for coaction therewith in such a way that both systems have the side adjacent to the inner container wall in common and that their adjoining sides include an angle of about 90 degrees.

7. The measuring instrument according to claim 1, together with means for damping the displacement of said system.

8. The measuring instrument according to claim 1, together with torsional ribbons for flexibly linking the sides of said system, and a device coacting with at least one of said torsional ribbons for distorting such ribbon to facilitate zero point adjustment of said system.

9. The measuring instrument according to claim 1, together with torsional ribbons for flexibly linking the sides of said system, one end of at least one of said ribbons being rotatably mounted, an arm secured to said rotatably mounted end, and means for angularly adjusting said arm to distort said ribbon for the purpose of adjusting said system to zero position.

10. Instrument for measuring sound radiation pressure including a container completely filled with a sound-conducting liquid, part of the wall of said container being permeable to sound, a displacement body of solid material, a device for disposing said body within the sound field in said container and movable therein in the direction of the sound radiation, said device comprising a rhomboid system formed by four torsional ribbons disposed parallel to each other, the ends of each of two of said ribbons being fastened to said body, the other two ribbons being fastened at their ends to an inner wall of said container, rigid means for connecting each of the ribbons fastened to said body with a corresponding ribbon fastened to said wall, and a pointer carried by one of said rigid means.

11. Instrument for measuring sound radiation pressure including a container completely filled with a sound-conducting liquid, part of the wall of said container being permeable to sound, a measuring system disposed within the sound field in said container comprising a displacement body which is movable against a reacting force in the direction of the sound radiation, an indicating element, means for transmitting to said indicating element the displacement of said body responsive to sound radiation pressure impinging thereon, and buoyancy means for exerting a lifting force on said system.

12. Measuring instrument according to claim 11, in which the weight of the displacement body and/or of parts of the measuring system associated therewith is less than the specific weight of the sound-conducting liquid.

13. Instrument for measuring sound radiation pressure comprising a container completely filled with a sound-conducting liquid, part of the wall of said container being permeable to sound, a measuring system disposed within the sound field in said container and being movable therein against a reacting force in the direction of the sound radiation, said system including a displacement body of solid material, an indicating element, and means for transmitting to said indicating element the displacement of said body responsive to sound radiation pressure impinging thereon, said displacement body being of slanting saddle-roof shape with the apex thereof extending within the plane of motion of said system.

14. Instrument for measuring sound radiation pressure comprising a container completely filled with a sound-conducting liquid, part of the wall of said container being permeable to sound, a measuring system disposed within the sound field in said container and being movable therein against a reacting force in the direction of the sound radiation, said system including a reflecting body, means for adjusting said body at an angle to the sound waves front, an indicating element, means for transmitting to said indicating element the displacement of said body due to sound radiation pressure impinging thereon, and absorber means disposed in said container in the path of the reflected radiation of said body, said absorber means being made of plastic material extending in the direction of the radiation to be absorbed.

15. Instrument for measuring sound radiation pressure comprising a container filled with a sound-conducting liquid and made of a material whose coefficient of expansion corresponds substantially to that of the liquid, part of the wall of the container being permeable to sound, a measuring system disposed within the sound field in said container and being movable therein against a reacting force in the direction of the sound radiation, said system including a displacement body of solid material which reacts to radiation pressure, an indicating element, and means for transmitting to said indicating element the displacement of said body due to sound radiation pressure impinging thereon.

16. Instrument for measuring sound radiation pressure comprising a principal container completely filled with a sound-conducting liquid, part of the wall of said container being permeable to sound, a measuring system disposed within the sound field in said container and being movable therein against a reacting force in the direction of the sound radiation, said system including a displacement body of solid material, an indicating element, means for transmitting to said indicating element the displacement of said body responsive to sound radiation pressure impinging thereon, an auxiliary open container forming a unit with said principal container outside of the plane of sound input thereof, said auxiliary container being adapted to hold a sound-conducting coupling liquid for receiving the sound-transmitting unit.

17. Measuring instrument according to claim 16, in which the inner wall of said auxiliary container is approximated to the outer shape of the sound-transmitting unit.

18. A measuring and indicating instrument of the class described comprising a container filled with a liquid adapted to conduct sound and ultrasound waves, means associated with a wall of said container forming a layer which is permeable to said waves, a displacement body disposed in said container which is movable therein against a reacting force substantially in the direction of sound propagation responsive to sound waves impressed upon said liquid through said layer, means forming a suitably calibrated scale, and means responsive to the displacement of said body for indicating the radiation pressure on said scale.

19. The instrument defined in claim 18, together with means coacting with said displacement body for counterbalancing, stabilizing and damping the displacement thereof.

20. The instrument defined in claim 18, wherein said layer is a diaphragm having a sound impedance which corresponds substantially to that of the conductive liquid.

21. The instrument defined in claim 18, wherein said layer is a diaphragm having the thickness of an even multiple of half-waves.

22. The instrument defined in claim 18, together with means extending substantially from the plane of said layer and forming an open-ended receptacle for receiving a liquid for immersion of sound-transmitting means therein, said layer being a diaphragmlike member having a sound impedance which corresponds substantially to that of the liquid in said receptacle and/or to that of the sound-conducting liquid in said container, respectively.

23. The instrument defined in claim 18, wherein said displacement body is made of a suitable material containing occluded air.

24. The instrument defined in claim 18, wherein said displacement body is made of a suitable sheet material which encloses an air space.

GEORG FIEDLER.

REFERENCES CITED

The following references are of record in the file of this patent:

UNITED STATES PATENTS

| Number | Name | Date |
| --- | --- | --- |
| 1,924,091 | Eisenhour | Aug. 29, 1933 |
| 2,043,983 | Alder | June 16, 1936 |
| 2,060,009 | Alder | Nov. 10, 1936 |

OTHER REFERENCES

Textbook of Sound, A. B. Wood, published by G. Bell and Sons Ltd. London, 1946.